Aug. 2, 1966 A. BRUEDER 3,264,040
ANTI-SKID BRAKE SYSTEM
Filed March 26, 1963 2 Sheets-Sheet 2

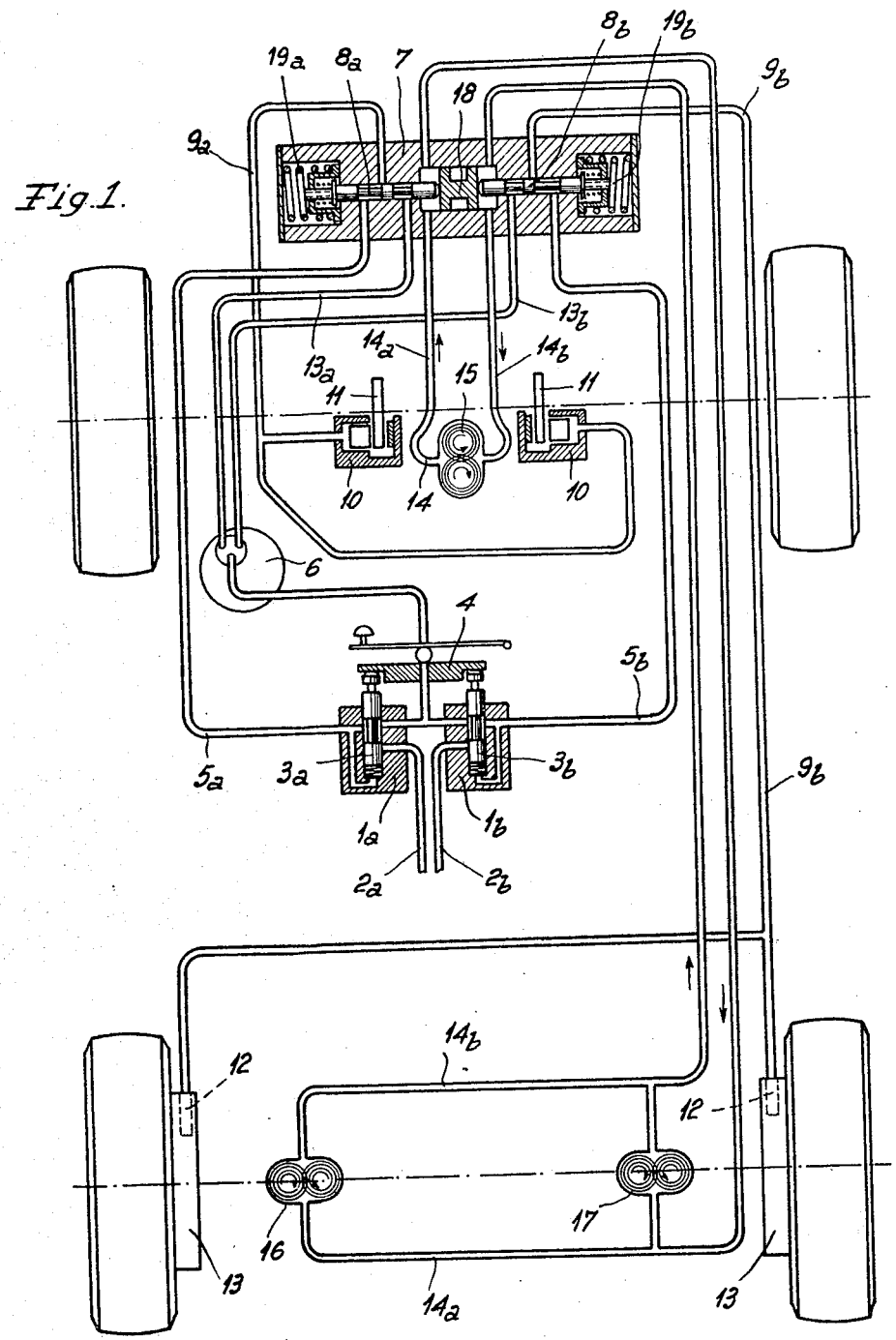

INVENTOR.
Antoine Brueder
BY
Wenderoth, Lind & Ponack
ATTORNEYS 3,264,040
ANTI-SKID BRAKE SYSTEM
Antoine Brueder, Paris, France, assignor to Societe
Anonyme Andre Citroen, Paris, France
Filed Mar. 26, 1963, Ser. No. 268,025
Claims priority, application France, May 11, 1962,
897,328, Patent 1,330,329
1 Claim. (Cl. 303—21)

It is well known that wheel skid occurring in a vehicle as a consequence of a loss of road adherence during a brake application, may have serious consequences for wheel skid is a common cause of many accidents.

It has already been proposed to equip vehicles with devices adapted to prevent wheel skid by releasing the braking pressure when one wheel became locked. However, these devices operating generally by inertia are detrimental in that they introduce jerks in the vehicle operation.

It is the essential object of this invention to provide a skid limiting device whereby the action produced on the braking pressure is exerted gradually and as a function of the velocity of rotation of the wheels, so that the braking pressure is restored gradually and no shocks or jerks develop. This invention is applicable to fluid-actuated braking systems and more particularly to hydraulic control systems wherein a fluid under pressure urges the brake linings against a disc or drum rigid with the road wheel, a double circuit supplying braking fluid separately to the front wheels, on the one hand, and to the rear wheels, on the other hand.

According to this invention, an auxiliary hydraulic circuit is provided which comprises a plurality of pumps each driven from one or the two wheels of a pair of front or rear wheels through suitable step-up gear means, this auxiliary hydraulic circuit comprising a distributor to which the hydraulic braking circuit is so responsive that the reduction in the velocity of a pump which results from the skidding of the locked pump-driving road wheel or wheels introduces into said circuit a pressure differential causing said distributor to cut off the braking pressure circuit leading to said wheel or wheels.

With the above and other objects in view which will become apparent from the detailed description below, some preferred forms of the invention are shown in the drawings in which:

FIGURE 1 is a diagrammatic view of one form of the invention.

Figure 1A:
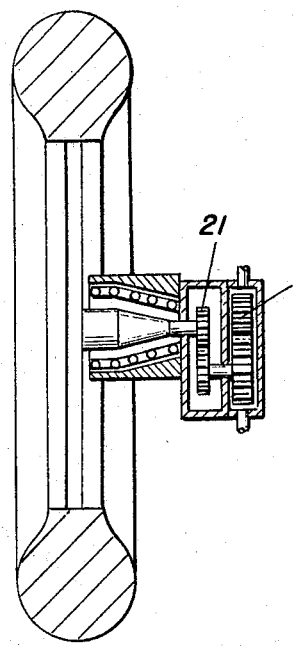
FIGURE 1a is a diagrammatic view illustrating a pump driven by a non-driven back wheel.

Referring to FIG. 1, the automobile vehicle illustrated is equipped with a conventional hydraulic braking system comprising a tandem master cylinder 1a, 1b, receiving fluid under pressure from separate sources 2a, 2b, slide valves 3a, 3b responsive to the action of a brake control member 4 and permitting the delivery of pressure fluid either to the brake lines 5a, 5b or to a reservoir 6.

Inserted in the lines 5a, and 5b is a distributor 7 comprising slide valves 8a, 8b normally allowing the liquid to flow respectively to pipe lines 9a, 9b connected to the brake cylinders, for example line 9a to the brake cylinders 10 acting upon the front wheel disc brakes 11 and line 9b to the brake cylinders 12 acting upon the rear wheel disc brakes 13 of the vehicle.

Return lines 13a, 13b connect the distributor 7 to the reservoir 6 for returning to the reservoir the excess liquid subsequent to each brake application.

Moreover, the arrangement comprises an auxiliary circuit 14 comprising a pump 15 driven from the front drive wheels at a velocity proportional to the average speed of both wheels, for instance by driving this pump through the secondary or lay-shaft of the change-speed transmission mechanism or gearbox which revolves, say, four times faster than the road wheels. Furthermore, branched in parallel on this circuit are two pumps 16, 17 driven respectively from each wheel at twice the wheel speed, these pumps 16, 17 being driven in such direction as to deliver their outputs to pump 15.

It is clear that for a variation $n$ occurring in the front wheel speed the velocity of the secondary or lay-shaft of the gearbox will vary by $4n/2$, that is $2n$, and similarly a variation $n$ in the velocity of a rear wheel involves a variation $2n$ of the wheel connected thereto; therefore, the sensitivities to speed variations in the front and rear wheels are the same. When no wheel skid occurs the four wheels rotate at the same speed and the pressures in the two circuit sections 14a and 14b correspond to a value $P_o$.

Assuming that one of the rear wheels becomes locked and skids, the output of pump 15 will exceed the outputs of pumps 16 and 17 taken together; therefore the fluid pressure will increase in circuit 14a and decrease in circuit 14b.

If both rear wheels are locked and skid simultaneously, the output variation will be twice as fast, and thus a same pressure differential in 14a and 14b is maintained for a skidding two times lesser.

If a front wheel skids, the output of pump 15 becomes inferior to that of pumps 16 and 17; thus, the fluid pressure decreases in circuit 14a and increases in circuit 14b.

From the foregoing it will be seen on the one hand that any wheel skid involves a pressure differential in circuits 14a and 14b (except the specific and exceptional case in which the four wheels are locked simultaneously and skid in the same manner) and on the other hand that the direction in which this pressure differential is produced depends on the axle in which the skidding took place.

It is the function of distributor 7 to sense the pressure differential in circuits 14a and 14b, and to act accordingly upon the brake circuits for discontinuing this skidding. To this end, this distributor incorporates a piston 18 having its end subjected to the pressures prevailing in circuits 14a and 14b respectively and engaged by the inner ends of slide valves 8a and 8b.

Assuming that during a brake application one of the rear wheels becomes locked and skids on the road surface, its velocity of rotation drops and tends to become zero. From the foregoing it appears that in this case the pressure in circuit 14a becomes higher than the pressure in circuit 14b; under these conditions, the piston 18 in distributor 7 is subjected to a greater pressure on its left-hand face as seen in the figure so that it tends to move to the right and to move slide valve 8b outwardly against the resilient resistance of spring 19b. Pipe line 5b is thus disconnected from line 9b and therefore the delivery of fluid pressure in brake cylinders 12 is discontinued, but this line 5b is now connected to the pipe line 13b leading to the reservoir 6. Then the rear brakes are released. When the skidding ceases, the wheel resumes its movement of rotation and the pump is driven again. The pressure differential is cancelled and the distributor 7 restores the braking circuit.

When a front wheel skids, the operation is similar, the difference in pressure acting in this case in the opposite direction so that piston 18 pushes the other slide valve 8a. The front wheel braking circuit is disconnected from the source of pressure fluid, and then connected to the reservoir 6.

Figure 1B:
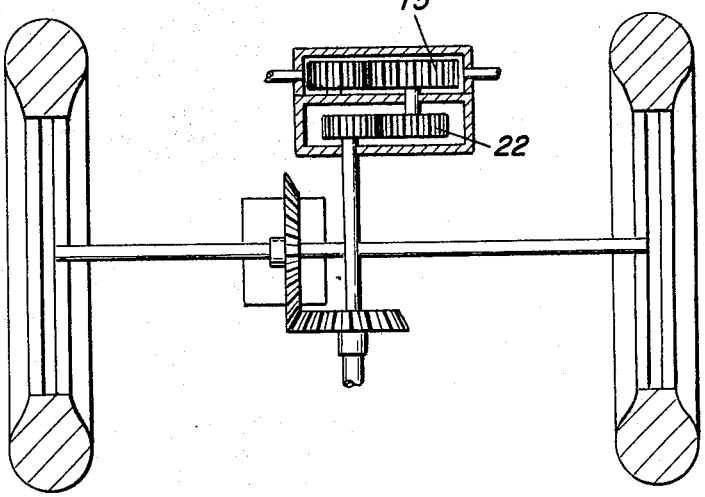
FIGURE 1b is a diagrammatic view illustrating a pump driven by a differential from the front wheels of the vehicle.

In FIG. 1a the pump 16 is shown as driven by a non-driven back wheel while FIG. 1b shows the pump 15 driven by a differential from the front wheels. The step-up gear is shown at 21 in FIG. 1a and at 22 in FIG. 1b.

Figure 2:
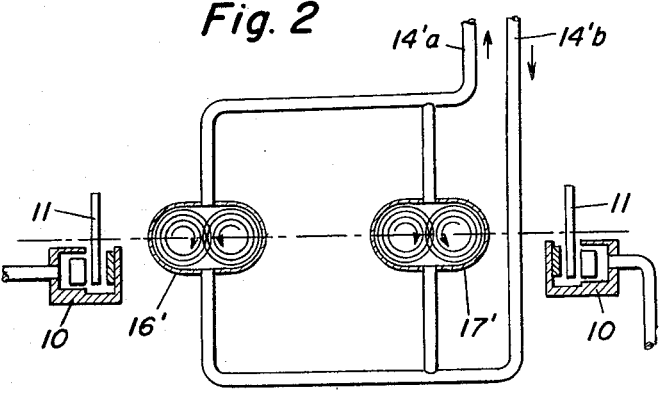
FIGURE 2 is a diagrammatic view of a detail illustrating a modification of the structure shown in FIGURE 1.

The modification illustrated in FIG. 2 of the drawings involves only the substitution of the pumps 16' and 17' for the pump 15 as shown in FIG. 1. These two pumps 16' and 17' are connected in parallel and the circuits 14'a and 14'b correspond to the circuits 14a and 14b in FIG. 1.

Obviously, with the device of this invention, the pressure variations in the brakes follow exactly the speed variations of the wheels, and the fluid pressure is restored gradually without any jerk or hunting, in the brake cylinders.

I claim:

An anti-skid braking system for a four wheeled vehicle, comprising a hydraulic braking circuit controlling the front and rear brakes, a closed auxiliary hydraulic circuit comprising a front and rear pair of pumps connected to said front and rear wheels respectively, wherein each pair of pumps is connected in parallel and the two parallel set of pumps are connected in a series circuit, a distributor in said braking circuit for controlling said braking, said distributor comprising a piston and brake controlled means connected thereto, each face of said piston being connected to one of the two sides of said series circuit respectively, so that a reduction in velocity of rotation of a pump which is caused by the skidding of a driving wheel produces a pressure differential in said auxiliary circuit, whereby said brake controlled means operates in response to said pressure differential to disconnect said braking pressure delivered to the front or rear wheel brakes.

References Cited by the Examiner

UNITED STATES PATENTS

| | | | |
|---|---|---|---|
| 2,025,889 | 12/1935 | Pardee | 303—21 |
| 2,132,916 | 10/1938 | Aikman | 303—21 |
| 2,869,687 | 1/1959 | Keim et al. | 188—181 |

FOREIGN PATENTS 874,639   5/1942   France.

EUGENE G. BOTZ, *Primary Examiner.*